(12) United States Patent
Abbas et al.

(10) Patent No.: US 7,073,732 B2
(45) Date of Patent: Jul. 11, 2006

(54) SCENTED FOAM STRING FOR HUNTING

(75) Inventors: Frederick M. Abbas, Houghton Lake, MI (US); Greg Allen Abbas, Beaverton, MI (US)

(73) Assignee: A-Way Hunting Products, Inc., Beaverton, MI (US)

(*) Notice: Subject to any disclaimer, the term of this patent is extended or adjusted under 35 U.S.C. 154(b) by 945 days.

(21) Appl. No.: 09/941,377

(22) Filed: Aug. 28, 2001

(65) Prior Publication Data

US 2003/0042329 A1 Mar. 6, 2003

(51) Int. Cl.
 *A62C 11/00* (2006.01)
 *A62C 13/62* (2006.01)
 *A24F 25/00* (2006.01)

(52) U.S. Cl. ............... 239/333; 239/302; 239/373; 239/34; 239/50; 239/60

(58) Field of Classification Search ............... 239/333, 239/302, 373, 34, 41, 50, 53, 60, 6, 136, 239/145; 222/394, 325, 402.13, 402.15, 402.25, 222/78, 175
See application file for complete search history.

(56) References Cited

U.S. PATENT DOCUMENTS

| | | | |
|---|---|---|---|
| 3,705,669 A | * 12/1972 | Cox et al. | ............... 222/394 |
| 4,609,245 A | 9/1986 | Sakschek | |
| 4,771,563 A | 9/1988 | Easley | |
| 4,788,787 A | 12/1988 | Konietzki | |
| 4,889,710 A | 12/1989 | Hagarty | |
| 5,072,856 A | * 12/1991 | Kimble | ............... 222/78 |
| 5,161,646 A | 11/1992 | Aurich et al. | |
| 5,303,496 A | 4/1994 | Kowalkowski | |
| 5,439,137 A | 8/1995 | Grollier et al. | |
| 5,555,665 A | 9/1996 | Fore | |
| 5,618,548 A | 4/1997 | Dawson | |
| 5,730,326 A | 3/1998 | Kaeser | |
| 5,746,019 A | 5/1998 | Fisher | |
| 5,862,960 A | 1/1999 | Miller et al. | |
| 5,947,379 A | 9/1999 | Freeman | |
| 5,971,208 A | 10/1999 | Kennedy | |

* cited by examiner

*Primary Examiner*—Davis Hwu
(74) *Attorney, Agent, or Firm*—Brooks Kushman P.C.

(57) ABSTRACT

This invention relates to a method and apparatus for distributing a chemical composition for hunting animals. The chemical composition is distributed in the form of a foam string. The chemical composition can be used to produce scents which attract animals or which mask human scents.

19 Claims, 3 Drawing Sheets

SCENTED FOAM STRING FOR HUNTING

BACKGROUND OF THE INVENTION

1. Field of the Invention

The present invention relates to a method and apparatus for distributing a chemical composition for hunting animals.

2. Background Art

Hunting is a sport in which a person attempts to capture or kill wild animals. Hunters incorporate various strategies and techniques when pursuing specific animals. For example, when hunting land animals, such as bear, deer, elk, moose, mule-deer, and the like, hunters often attempt to attract the animals to one or more predetermined locations. Animals, however, must have some motivation or incentive to come to these locations.

In general, animals are allured to a number of scents and particularly to those scents produced by foods and other animals. In response, the hunter tries to attract animals to the hunting area by generating these types of scents. In the past, hunters have tried to generate food scents by using baits like bacon, acorns, and apples. They have also tried to generate animal scents by spreading urine in simulated scrapes.

There are problems with transporting ediferous, clumsy and perishable items like apples, acorns and bacon into the difficult terrain of the wilderness. When capturing or killing the animals, there are more problems that stem from the animal's survival instincts. For example, when the hunter contaminates the area or the bait with human odors, or when the scent-producing device causes threatening gyrations, the animals tend to keep away from the hunting area. These problems are further complicated if the hunter wants to stay in the hunting area, for example, when laying in wait to attack the animal. Especially in spreading urine, there are problems with liquid or gel type scent producers in that most of them will either evaporate, absorb into the ground, freeze, require refilling, wash away with the rain, or otherwise become less useful to the hunter. Most types of scent producers problematically require continuous supervision and attention by the hunter.

SUMMARY OF THE INVENTION

This invention addresses the above-problems with an apparatus and method for distributing a chemical composition for hunting animals.

In one embodiment of the present invention, an apparatus for distributing a chemical composition for hunting animals is disclosed. The apparatus comprises a dispenser and a foam string being dispensed by the dispenser, wherein the foam string includes the chemical composition.

The foam string includes a number of features and aspects. For example, the string can be an encapsulated plastic. The string can also be strong enough to withstand reasonable environmental factors. For example, snow, wind and rain can blow through and stress the string without causing it to break. Additionally, the string can be adhesive to targets like trees, shrubs, grass, rocks, or earth. Furthermore, the string can be water-based and controlled for a selected period of time to dissolve into the earth in an environmentally friendly manner.

In greater detail, the string includes a first outer layer having some of the chemical composition. The first outer layer becomes a brittle crust layer that is delaminated by rain or other factors to expose a second layer. The second layer is fresher than the brittle first layer and includes some more of the chemical composition. The first layer can be configured to become brittle after a selective period of time before falling off and exposing the second fresher layer. Alternatively, the string can be configured to remain flexible for a selective period of time before the first layer falls off or before the string dissolves or absorbs into the earth.

According to other aspects of the invention, the string can be dispensed from a can, such as an aerosol can, having an enclosure for storing the chemical composition and a propelling assembly for propelling the chemical composition from its storage position within the enclosure. The dispenser can be configured to propel the string far enough away from the hunter that the hunter does not contaminate himself, the string, or the hunting area. Additionally, the hunter could direct the string scent to branches behind him while on the stand in a tree to attract an animal or to mask his own odor.

According to yet other aspects of the invention, the chemical composition can be a composition that attracts an animal. The chemical composition can also be a composition that masks human scents. Typically, environmental scents, such as pine, earth, fox urine or the like can be used to mask human scents. Still further, the chemical composition can include urine of an animal, or synthetic urine of an animal.

According to another embodiment the present invention, a method for a hunter to hunt animals by dispensing a chemical composition that emits a scent for attracting animals or masking human scents is disclosed. The method comprises configuring a can to dispense a liquid-gas foam string of encapsulated plastic resin. The string includes the chemical composition. The method further comprises configuring the chemical composition to emit the scent for a selected period of time after being dispensed from the aerosol can. Finally, the method comprises dispensing the string from the aerosol can onto a target. Preferably, the string is dispensed substantially far enough away from the can that the hunter does not substantially contaminate an area around the target.

The present invention provides numerous advantages to those attempting to capture or kill wild animals. For example, the present invention can provide a scent-producer that can be activated without contaminating the hunting area or the hunter with undesirable scents. Advantageously, the present invention can also mask and cover up human odors. Additionally, the present invention requires only limited supervision by the hunter since it can release scent over a preselected period of time and produces only minor gyrations. Further, the apparatus and method of the present invention can be designed to be unaffected by environmental conditions like snow, rain and wind. Finally, the present invention is environmentally friendly and inexpensive.

DETAILED DESCRIPTION OF THE PREFERRED EMBODIMENTS

Figure 1:
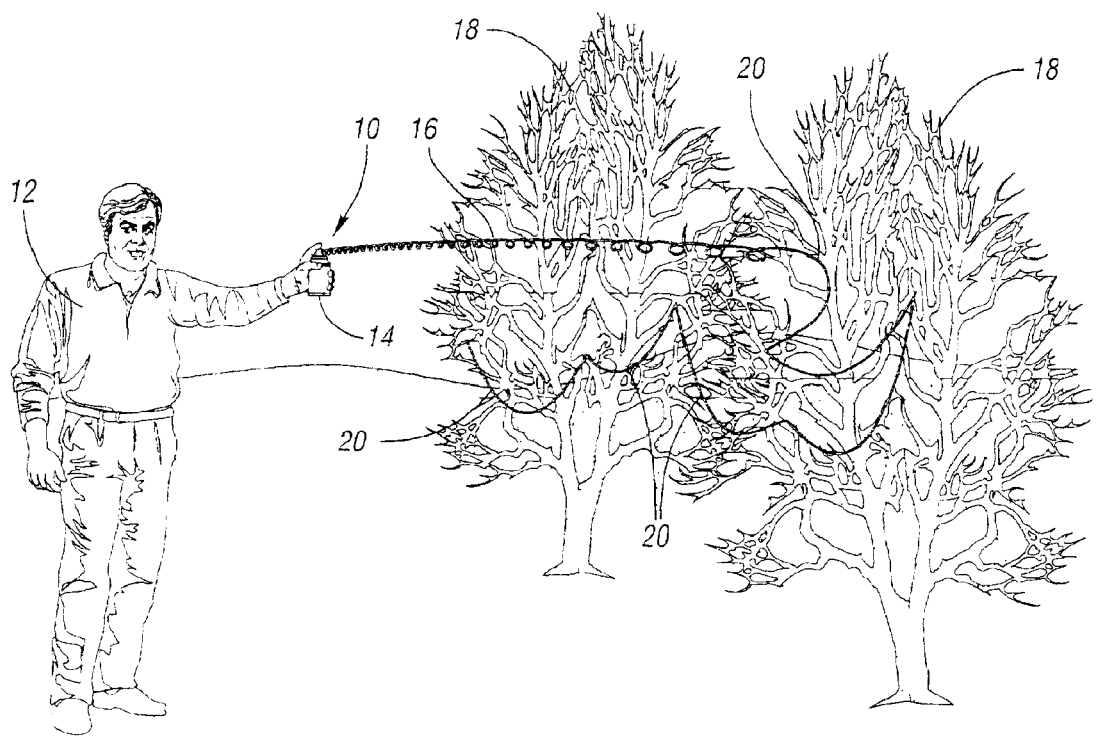
FIG. 1 is a hunting scene illustrating an apparatus for distributing a chemical composition in the form of a foam string, according to one embodiment of the present invention.

FIG. 1 is a wilderness scene illustrating an apparatus 10 and a hunter 12. The hunter 12 actuates the apparatus 10 to distribute a chemical composition in the form of a foam string 16. The hunter 12 directs the foam string 16 toward a target 18. As depicted, one form of the target 18 may be a pair of trees or bushes having branches 20. The foam string adheres to the trees or bushes 18 and across the branches 20. The string 16 is positioned upon the branches 20 by firing the string 16 across the branches 20, or by adhering one end of the string 16 to the tree 18, and the hunter 12 positioning the other end with his hand onto another branch 20. The hunter 12 can touch, and even manipulate the string 16, if he wishes. The ability of chemical composition to emit the scent is not severely hindered by the hunter 12 handling the string 16.

The string 16 is sufficiently stable that it can hang across large expanses between the branches 20 without breaking under its own weight. In one embodiment, the string 16 can be an encapsulated plastic resin. The string is sufficiently strong to withstand reasonable environmental factors, such as snow, wind and rain. For example, snow, wind and rain can blow through and stress the string 16 to spread the scent without causing it to snap. As such, when the string 16 is hanging from the branches 20, a scent produced by the chemical composition is easily carried by the wind to areas surrounding the string 16.

The chemical composition of the string 16 can be manipulated so that the string 16 can become brittle after a predetermined period of time. The chemical composition can also be manipulated so that the string 16 remains flexible for a period of time.

It should be noted that the string 16 is shown as being adhesive to the tree target 18, but the string 16 is likewise adhesive to shrubs, grass, rocks, plants, and the like.

Figure 2:
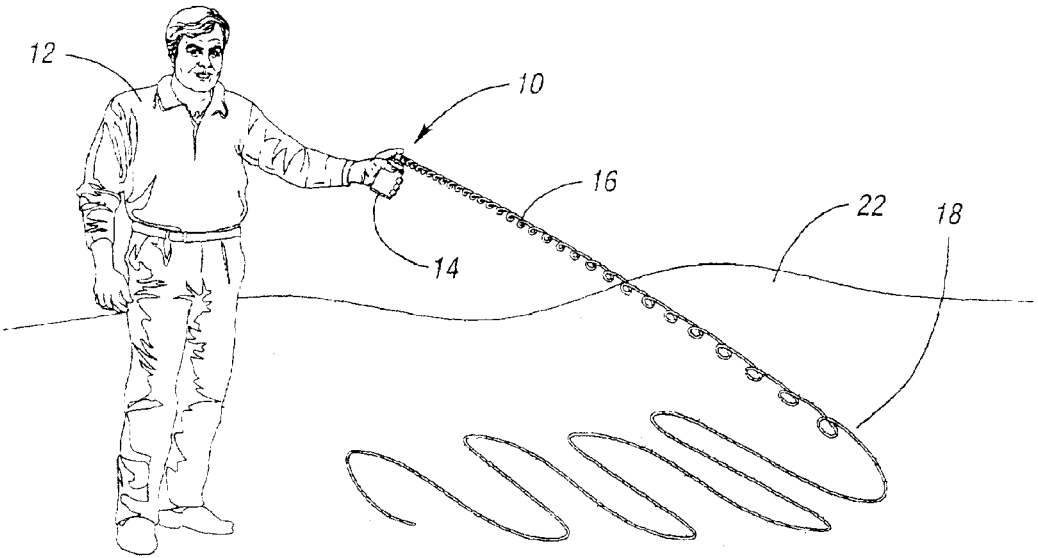
FIG. 2 is a hunting scene illustrating an apparatus for distributing a chemical composition in the form of a foam string, according to another embodiment of the present invention.

FIG. 2 is a wilderness scene illustrating another embodiment of the present invention where the target 18 is earth 22. The chemical composition of the foam string is such that when the string 16 is applied to the earth 22, it does not dissolve or absorb into the earth 22 until after a predetermined period of time. Since most scrapes require a constant supply of scents to attract or repel the animals, it is particularly advantageous that the string 16 does not dissolve or absorb into the earth for a controllable period of time. This way, the hunter 12 can travel to remote locations and lay bait or simulate a scrape without having to return to that location for a longer period of time, such as hours or days. Let it be noted that the string 16 is depicted as being distributed before impact with the target in a straight line. In other situations, it may be advantageous for the string 16 to be dispensed in other patterns and configurations, like a circle or a ball.

Figure 3:
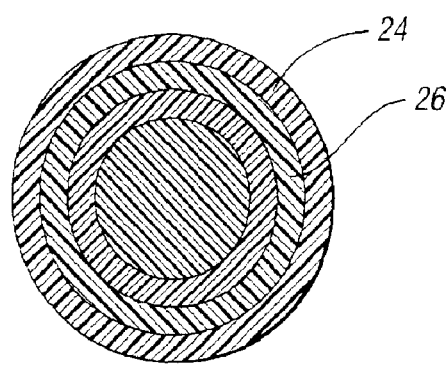
FIG. 3 illustrates a cross-section of the foam string.

FIG. 3 illustrates a cross-section of the foam string 16 having a first outer layer 24 and a second outer layer 26, and additional layers therewithin. After a predetermined period of time, like hours or days, the outer layer 24 starts to become brittle and the quantity of scent produced begins to diminish.

Figure 4:
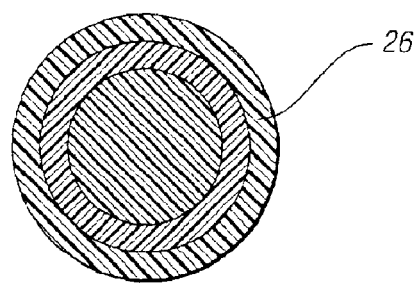
FIG. 4 illustrates a cross-section of the foam string in FIG. 3 after an outer layer has been delaminated.

FIG. 4 illustrates an embodiment of the present invention in which the outer layer 24 can be delaminated by dew, rain or other environmental factors to expose the second outer layer 26. The second outer layer 26 is typically fresher than the first outer layer 24. The fresher layers emit more scent, and thus can increase the level of scent as compared to that of the previous layer. The time in which it takes the outer layer to decrease in scent supply and become brittle is affected by the chemical composition and the thickness of the layers 24, 26.

Figure 5:
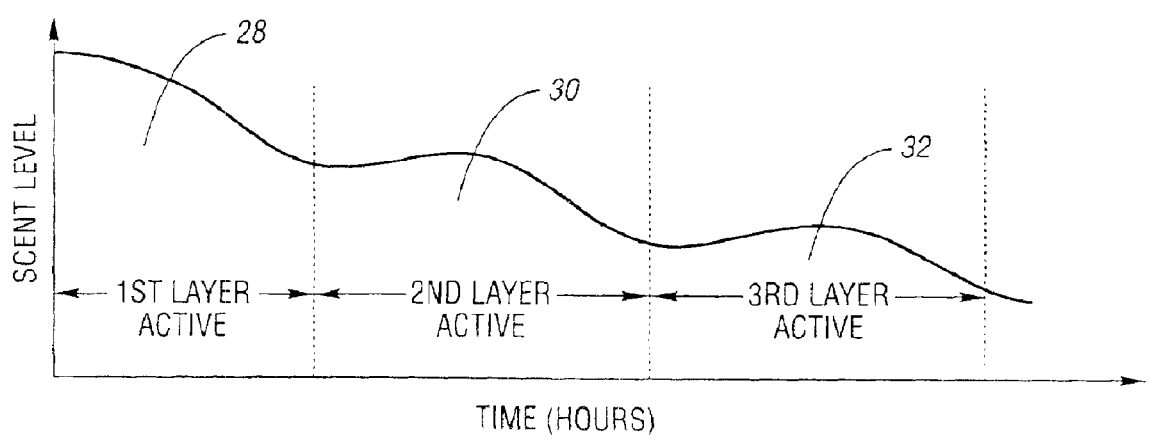
FIG. 5 is a graphical representation of a scent level of the foam string over a period of time.

FIG. 5 is a graphical illustration which depicts the decay or degradation of the scent produced by the first outer layer 24 over a unit of time and how the scent level changes when the first outer layer 24 is delaminated to expose the second outer layer 26. The unit of time is selectable according the thickness of the layers 24, 26 and the arrangement of the chemical composition. For example, the first outer layer 24 can delaminate after time period 28 expires. Upon expiration of the time period 28, the second outer layer 26 is exposed until a time period 30 expires. The next layer then is exposed for the time period 32, and so on. While the time periods 28, 30, 32 appear to be uniform, they can be time periods which are different in length. Additionally, it should be realized that any layer may include one or more mixtures of time-release capsules, at least some of which may contain a desired scent.

Figure 6:
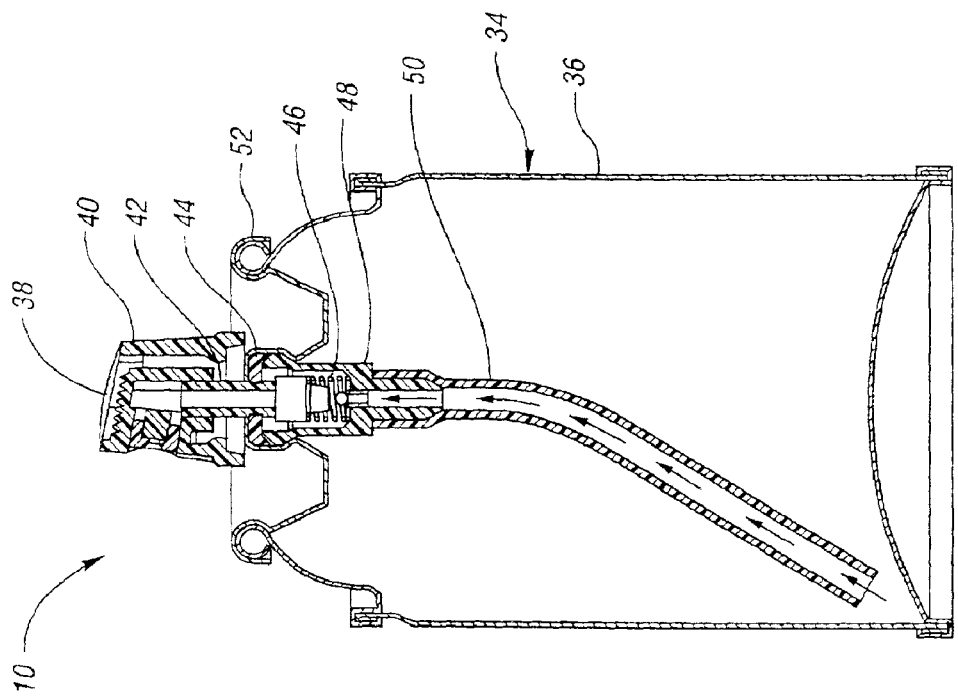
FIG. 6 is a cross section of a dispenser for dispensing the foam string before being actuated.

FIG. 6 illustrates a dispenser or can 10 adapted for dispensing the foam string 16 before the dispenser 10 has been actuated. The dispenser 10 can be an aerosol-type can that propels the string 16 far enough away from the hunter that the hunter does not substantially contaminate himself 12, the string 16, or the hunting area with human odor. The dispenser 10 typically includes an enclosure 34 defined perimeterly by a can 36 and a propelling assembly 38. The chemical composition is stored within the enclosure 34. The chemical composition is such that it produces scents in all kinds of weather, including freezing temperatures. The chemical composition comprises a liquid concentrate and a propellant. The liquid concentrate includes an active material and a base liquid.

Figure 7:
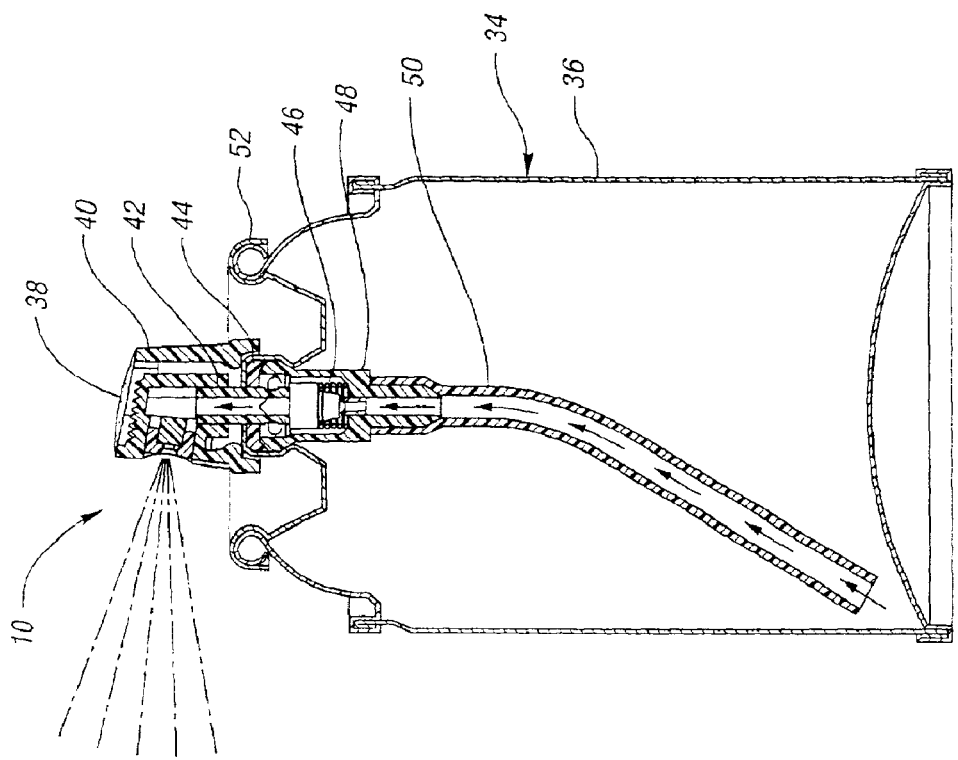
FIG. 7 illustrates the dispenser of FIG. 6 after being actuated.

In FIGS. 6–7, the propelling assembly 38 includes an actuator 40, a valve stem 42, a gasket 44, a spring 46, a housing 48, a dip tube 50, and a mounting cup 52. Upon actuation of the actuator 40, the chemical composition is expelled through the valve stem 42 and out into the environment to form the foam string 16.

The active material supplies the scent for producing any number of odors. In particular, the scents can be those which attract animals and those which mask human scents. Scents which tend to attract animals include those which smell like appealing foods or other animals. In some cases, the scent may even include using urine from real animals. Since urine is relatively expensive, synthetic urine can be substituted for the actual urine. Scents which tend to mask human scents include those of food and other animals, and environmental scents such as pine, earth, and the like. Typically the hunter will permeate a larger area with the scent to mask human odors.

The base liquid includes the materials necessary to make the foam string 16. The base liquid is a water-based emulsion containing water, a solvent like isopropyl alcohol, a surfactant, an emulsifier, paraffinic oil, inhibitors, and an attractant in an oil form. The base liquid also includes a non-hazardous acrylic resin and a filler powder.

The propellant is a liquefied gas blend consisting of an isobutane and propane mixture. The string 16 is thereby dispensed during the propelled evacuation of the chemical composition from the enclosure 34. The string 16 is fabricated in situ during the evacuation from the reaction of the plastic resin, surfactant, and propellant.

The dispenser 10 stores the chemical composition within the enclosure 34. The enclosure 34 is defined by the can 36 and the propelling assembly 38. The dispenser 10 is small enough to be easily carried on the hunter's body, for example, it can clip to the hunter's belt or be stored in his pocket. The dispenser 10 is environmentally friendly, in that it can be constructed with recyclable materials and does not produce chlorofluorocarbons.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for distributing a scented chemical composition for hunting animals, the method comprising:

providing a pressurized dispenser for pressure based dispensing of a foam string from a distance away from a target, the distance being sufficient to avoid an ambient environment being contaminated by human scent, the foam string including the scented chemical composition to attract animals or mask human scent or both; and discharging the foam string toward the target.

2. A method for a hunter to hunt animals by dispensing a chemical composition that emits a scent from a dispenser, the method comprising;

configuring a can to dispense a liquid-gas foam string of encapsulated plastic resin, the string including the chemical composition;

providing the chemical composition so as to emit the scent for a selected period of time after being dispensed, wherein the scent attracts animals or masks human scent; and dispensing the string from the can toward a target, the string being dispensed far enough away from the can that the hunter does not substantially contaminate an area around the target.

3. An apparatus for distributing a scented chemical composition for hunting animals, the apparatus comprising:

a dispenser; and a foam string dispensed by the dispenser, the foam string having a first outer layer having at least part of the chemical composition, wherein the first outer layer becomes a brittle crust layer that is delaminated to expose a second layer fresher than the first layer and having at least part of the chemical composition.

4. The apparatus of claim 3, wherein the foam string comprises a liquid-gas foam string.

5. The apparatus of claim 3, wherein the chemical composition comprises a chemical composition that emits a scent for a selected period of time.

6. The apparatus of claim 3, wherein the chemical composition comprises a composition that attracts an animal.

7. The apparatus of claim 3, wherein the chemical composition includes urine of an animal.

8. The apparatus of claim 3, wherein the urine of the animal is synthetic.

9. The apparatus of claim 3, wherein the chemical composition comprises a chemical composition that masks human scent.

10. The apparatus of claim 3, wherein the chemical composition comprises an environmental scent selected from the group consisting of pine, earth, fox urine, and mixtures thereof.

11. The apparatus of claim 3, wherein the dispenser comprises a can having a enclosure for storing the chemical composition and a propelling assembly for propelling the chemical composition from its storage position within the enclosure so that the foam string can be dispensed toward a target from a distance away from being sufficient to avoid an ambient environment between the dispenser and the target from being contaminated by human scent.

12. The apparatus of claim 3, wherein the foam string adheres to a target.

13. The apparatus of claim 3, wherein the foam string is water-based.

14. The apparatus of claim 3, wherein the foam string comprises an encapsulated plastic resin.

15. The apparatus of claim 3, wherein the foam string is sufficiently strong that the string may be applied to a target in a manner that allows environmental factors such as snow, wind and rain to impact and stress the string without substantially affecting its ability to remain applied to the target.

16. The apparatus of claim 3, wherein the foam string becomes brittle after a selected period of time.

17. The apparatus of claim 3, wherein the foam string remains flexible for a selected period of time.

18. The apparatus of claim 3, wherein the foam string dissolves slowly so that the string does not substantially dilute or dissolve into the earth until a selected period of time elapses.

19. The apparatus of claim 3, wherein the dispenser discharges the string toward a target that is located far enough away from a user that the user does not substantially contaminate himself, the sting, and an area around the target with human scent.

* * * * *